(12) United States Patent
Ito et al.

(10) Patent No.: US 6,524,095 B1
(45) Date of Patent: Feb. 25, 2003

(54) INJECTION MOLDING MACHINE WITH NOZZLE TOUCH MECHANISM

(75) Inventors: Susumu Ito, Hino (JP); Yonbon Ban, Seoul (KR)

(73) Assignee: Fanuc Ltd., Yamanashi (JP)

( * ) Notice: Subject to any disclaimer, the term of this patent is extended or adjusted under 35 U.S.C. 154(b) by 58 days.

(21) Appl. No.: 09/628,689

(22) Filed: Jul. 28, 2000

(30) Foreign Application Priority Data

Aug. 2, 1999 (JP) ............................................ 11-218414

(51) Int. Cl.[7] .............................................. B29C 45/80
(52) U.S. Cl. ...................................................... 425/574
(58) Field of Search ................................ 425/574, 576, 425/589, 562

(56) References Cited

U.S. PATENT DOCUMENTS

| 4,070,139 A | 1/1978 | Linde et al. |
| 5,912,020 A | 6/1999 | Grunitz |

FOREIGN PATENT DOCUMENTS

| EP | 0 563 397 A1 | 4/1993 |
| EP | 0 911 959 A1 | 4/1999 |
| JP | 8-1062 | 1/1996 |
| JP | 09277306 A | 10/1997 |

OTHER PUBLICATIONS

Patent Abstracts of Japan 62080014, published Apr. 13, 1987.

*Primary Examiner*—Tim Heitbrink
(74) *Attorney, Agent, or Firm*—Staas & Halsey LLP

(57) ABSTRACT

A nozzle touch mechanism for an injection molding machine capable of preventing inclination of a mold and a platen caused by a nozzle touch force, and carrying out maintenance and inspection of the injection mechanism with ease. A connection member is fixed to the stationary platen at opposite positions with respect to a nozzle touch position. One end of a ball-screw shaft of a ball screw mechanism is attached to the connection member rotatably. An injection mechanism is moved with an extruder bed by the ball-screw mechanism driven by a motor through a spring towards the stationary mold attached to the stationary platen, so that a nozzle of the injection mechanism touches a spool of the stationary mold. A nozzle touch force exerted on the stationary mold is transmitted to the connection member and balanced with a pulling force of the connection member transmitted from the ball-screw shaft. A moment is produced on the connection member but no moment is produced on the stationary platen. Thus, the stationary platen and the stationary mold are not inclined. The injection mechanism can be swivel about a swivel pin since the ball screw mechanism is not arranged on the side of the injection mechanism.

10 Claims, 6 Drawing Sheets

INJECTION MOLDING MACHINE WITH NOZZLE TOUCH MECHANISM

BACKGROUND OF THE INVENTION

1. Field of the Invention

The present invention relates to an injection molding machine and particularly to a nozzle touch mechanism of the injection molding machine.

2. Description of Related Art

In an injection molding machine for molding a product by injecting molten material such as resin and metal into a cavity formed by a stationary mold and a movable mold from a nozzle provided at a distal end of a heating cylinder of an injection mechanism, a nozzle touch mechanism is provided for moving the injection mechanism relatively to a stationary platen to which the stationary mold is attached so that the nozzle is pressed towards and retracted from a spool of the stationary mold.

FIG. 11 shows a conventional nozzle touch mechanism of an injection molding machine. In FIG. 11, a stationary mold 40 is attached to a stationary platen 30 and a bearing unit 31 for supporting one end of a ball-screw shaft 61 rotatably but axially unmovably is fixed to the stationary platen 30. The other end of the ball-screw shaft 61 is connected to an output shaft of a motor 65 through a coupling 64. A ball-screw nut 62 is threadedly engaged with the ball-screw shaft 61 and supported unrotatably with respect to an extruder bed 20. A spring 63 is intervened between the ball-screw nut 62 and the extruder bed 20. An injection mechanism 10 is mounted on the extruder bed 20 and connected thereto via a swivel pin 21 for a swivel motion. The extruder bed 20 is guided by a linear guide having a guide rod or rail, not shown, movably close to and away from the stationary platen 30. Thus, the injection mechanism 10 is allowed to linearly move towards and away from the stationary platen 30 with the extruder bed 20 and also to swivel about the swivel pin 21 on the extruder bed 20.

For performing a nozzle touch, the motor 65 is driven to rotate the ball-screw shaft 61 such that the ball-screw nut 62 which is unrotatably supported moves forward to the stationary platen 30 (right-hand direction in FIG. 11). The ball-screw nut 62 moves the extruder bed 20 forward through the spring 63 so that a nozzle 10a at a distal end of a heating cylinder 10b of the injection mechanism 10 touches a spool of the stationary mold 40 attached to the stationary platen 30. The servomotor 65 is continuously driven after the nozzle 10a touches the spool of the mold 40 to forward the ball-screw nut 62 to make the spring 63 compressed to urge the extruder bed 20 and the injection mechanism 10 toward the stationary platen 30 so that the nozzle 10a presses the mold 40 by an elastic force of the spring 63. This pressing force applied from the nozzle 10a to the spool of the stationary mold 40, i.e. a nozzle tough force is transmitted from the stationary mold 40 to the stationary platen 30 to produce a moment to incline the stationary platen 30 and the stationary mold 40 as shown by the dotted line in FIG. 11.

The inclination of the stationary mold 40 causes opposing faces of a movable mold (not shown) and the stationary mold 40 to be nonparallel to each other, which may raise a problem of damaging pins guide holes provided at the opposing faces by an interference between them in clamping the molds by a clamping mechanism.

In order to solve the above problem, there is known from Japanese Patent Publication No. 9-277306 a nozzle tough mechanism for preventing a bending moment on the stationary mold by the nozzle tough force by fixing one end of a rotation/linear-motion converting mechanism such as the ball screw mechanism on the stationary platen laterally with respect to a position of the nozzle tough.

FIGS. 12a and 12b are a plan view and a side view, respectively, of the nozzle touch mechanism known from Japanese Patent Publication No. 9-277306 for preventing the bending moment on the stationary platen.

In FIGS. 12a and 12b, the same or equivalent member as shown in FIG. 11 is indicated by the same reference numeral and a reference numeral 32 denotes a fixing member for fixing one end of the ball-screw shaft 61 on the stationary platen 30. As seen from FIGS. 12a and 12b, fixing points of the ball-screw shafts 61 are arranged at opposite positions with respect to the nozzle touch position. Specifically, levels of the fixing points of the ball-screw shafts 61 are substantially the same as the level of the nozzle touch position.

Forward and backward motions of the injection mechanism close to and away from the stationary platen 40 are performed by a rotation of the motor 65. The rotation of the motor 65 is transmitted to the ball-screw nuts 62 through a gear transmission mechanism 66 to rotate the ball-screw nuts 62 in synchronism with each other. Since the ball-screw nuts 62 are supported by the injection mechanism 10 to be rotatable but unmovable in the axial direction of the ball-screw shafts 61 relative to the injection mechanism 10, and the ball-screw shafts 61 are fixed to the stationary platen 30, the ball-screw nuts 62 are moved in the axial direction by a lead of the ball-screw shaft with one rotation thereof. With the axial motion of the ball-screw nuts 62, the injection mechanism 10 connected fixedly with respect to the axial direction is moved forward and backward with respect to the stationary platen 30. When the nozzle 10a at the distal end of the heating cylinder 10b touches the spool of the stationary mold 40 attached to the stationary platen 30 and applies pressure to the spool, no bending moment is produced on the stationary platen 30 since the stationary platen 30 is connected to the ball-screw shafts 61 at the same-level as that of application of the nozzle touch force, so that the stationary platen 30 and the stationary mold 40 are prevented from being inclined.

In the nozzle touch mechanism for preventing the stationary mold and the stationary platen from being inclined by the nozzle touch force as shown in FIGS. 12a and 12b, the ends of the ball-screw shafts have to be arranged on opposite positions on the stationary platen at the same level as that of the nozzle touch position on the stationary mold. This means that the ball-screw shafts are arranged parallel with each other at the same level as that of the heating cylinder of the injection mechanism. Further, the ball-screw nuts have to be driven in synchronism with each other to exert driving force to the injection mechanism 10 at the same speed. To meet these requirements, there arises a problem that the driving mechanism of the nozzle touch mechanism is complicated.

Further, the ball screw mechanisms arranged on both sides of the heating cylinder are inconvenient in maintenance and inspection of the heating cylinder. In order to carry out the maintenance and inspection of the heating cylinder including an exchange of the heating cylinder or the injection screw for a new one, it is necessary to retract the injection mechanism to the position where the nozzle does not interfere with the stationary platen 30 and swivel the injection mechanism on the extruder bed 20 about the swivel pin 21. The above arrangement requires removal of the connection between the stationary platen 30 and the ball-screw shafts 61 of the ball-screw mechanism as a rotation/linear-motion converting mechanism. Furthermore, after finishing the maintenance or inspection, it is necessary to adjust the center of the ball-screw shaft of the ball screw mechanism to retrieve the operational state, so that operations for the maintenance and inspection of the heating cylinder are made laborious.

SUMMARY OF THE INVENTION

An object of the present invention is to provide an injection molding machine capable of preventing inclination of a mold and a stationary platen by a nozzle touch force and carrying out maintenance and inspection of the injection mechanism with ease.

An injection molding machine of the present invention comprises a nozzle touch mechanism for moving an injection mechanism relatively to a mold attached to a stationary platen so that a nozzle of a heating cylinder touches and pushes a spool of the mold. The nozzle touch mechanism has a support member for supporting the injection mechanism to be movable, and a driving unit arranged lower than a heating cylinder of the injection mechanism for moving the injection mechanism supported by the support member, and a connection member for connecting the stationary platen with the driving unit. The connection member and the stationary platen are connected at symmetrical positions with respect to a central axis of the nozzle. With the above arrangement, a nozzle touch force exerted on the mold from said nozzle is transmitted to the stationary platen and balanced with a force exerted thereon from the connection member, so that no bending moment is produced on the stationary platen.

The connection member may be supported on a base of the injection molding machine linearly movably only in the moving direction of the nozzle of the injection mechanism. The support member may be guided by a linear guide having a guide rail or a guide shaft, and the connection member may be supported linearly movably by the linear guide. Alternatively, the connection member may be supported by a leaf spring on the base of the injection molding machine.

The connection member may be formed into a U-shape having one end connected to the stationary platen and the other end connected the driving unit.

The driving unit may comprise a ball-screw mechanism having a ball-screw shaft and a ball-screw nut engaged with the ball-screw shaft, and a motor for driving the ball screw mechanism. In a preferable embodiment, the ball-screw shaft is supported by the connection member rotatably but unmovably relatively to the connection member and is driven by said motor, and the ball-screw nut is supported by the support member unrotatably. The motor may be mounted on the base of the injection molding machine or on the connection member.

DETAILED DESCRIPTION OF THE PREFERRED EMBODIMENTS

Figure 1:
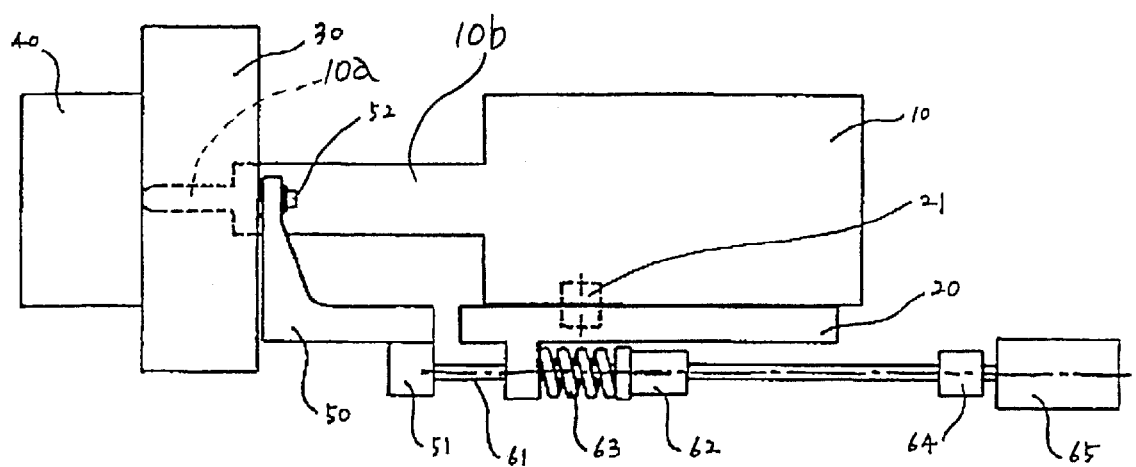
FIG. 1 is a schematic diagram of a nozzle tough mechanism for an injection molding machine according to one embodiment of the present invention.
Figure 2:
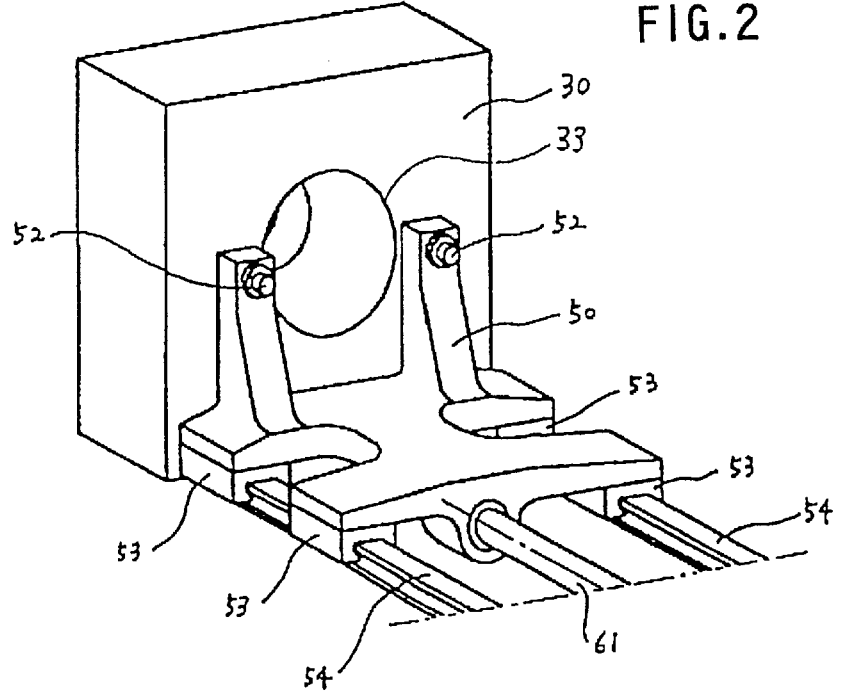
FIG. 2 is a partially perspective view showing relation of a connection member and a stationary platen in the nozzle touch mechanism shown in FIG. 1.
Figure 3:
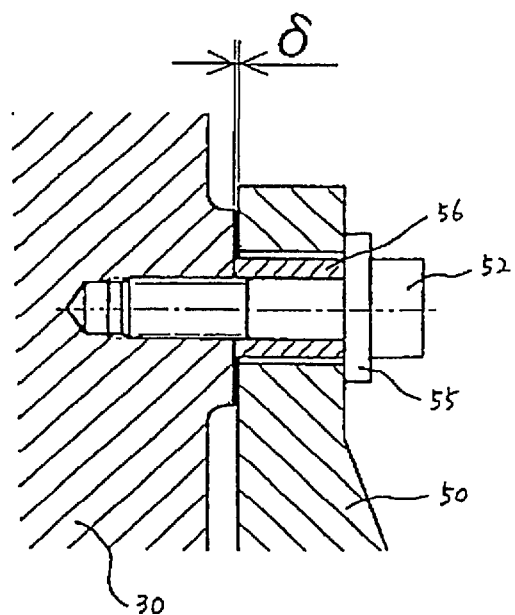
FIG. 3 is an enlarged sectional view of the connection portion of the stationary platen and the connection member as shown in FIG. 2.
Figure 11:
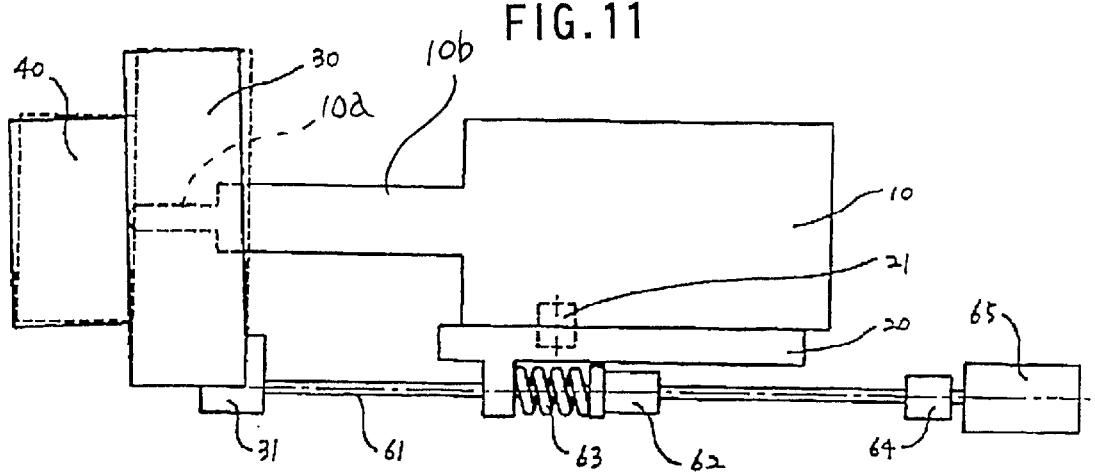
FIG. 11 is a schematic plan view of a conventional nozzle touch mechanism showing inclination of a stationary platen.
Figure 12A:
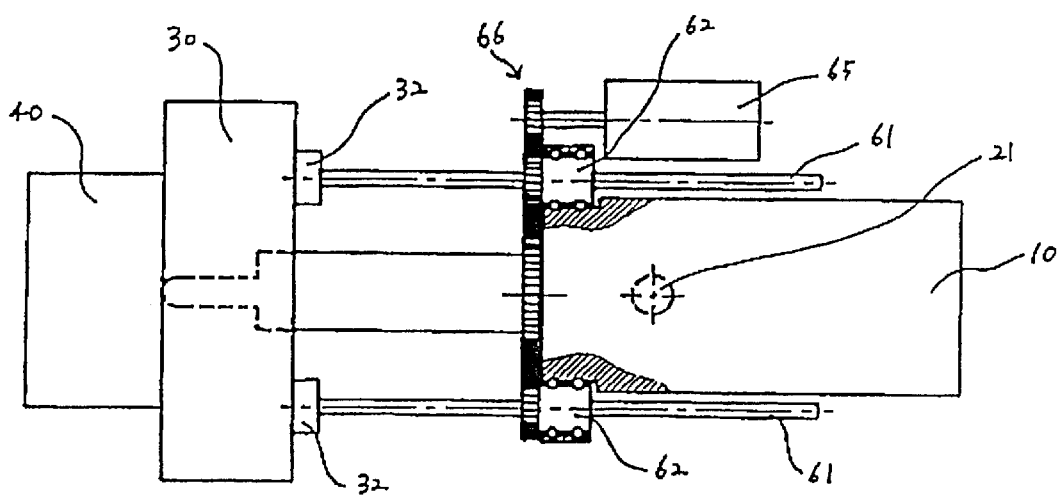
FIGS. 12a and 12b are a plan view and a side view, respectively, of a known nozzle touch mechanism for preventing the inclination of the stationary platen.
Figure 12B:
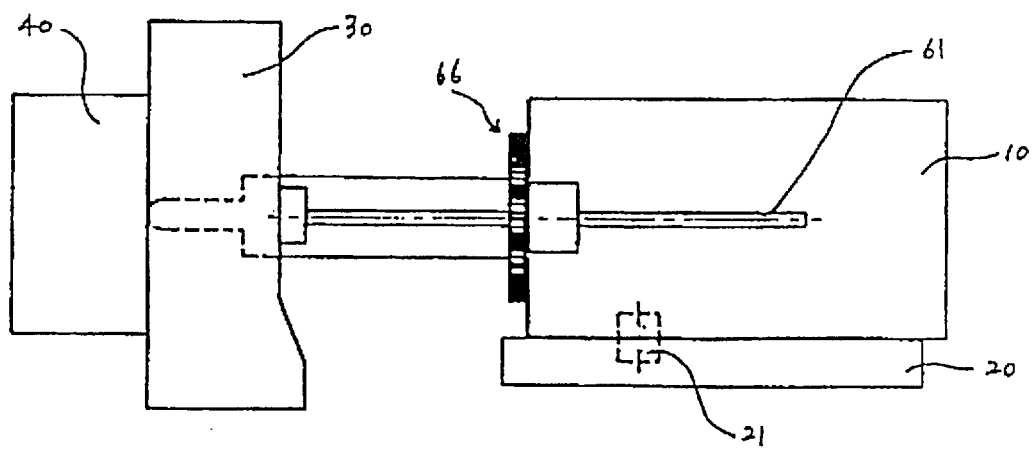

FIG. 1 schematically shows a nozzle touch mechanism of an injection molding machine according to one embodiment of the present invention. The nozzle touch mechanism shown in FIG. 1 differs from the known nozzle touch mechanisms shown in FIGS. 11, 12a and 12b in that the ball-screw shaft of the ball screw mechanism as a rotation/linear-motion converting mechanism is connected to the stationary platen through a connection member, whereas the ball-screw shaft is connected directly to the stationary platen in the nozzle touch mechanisms shown in FIGS. 11, 12a and 12b. In FIGS. 1 to 3, the same or equivalent element in the nozzle touch mechanism shown in FIGS. 11, 12a and 12b is indicated by the same reference numeral.

The connection between the connection member 50 and the stationary platen 30 is shown in FIG. 2. A nozzle inserting hole 33 is formed in the stationary platen 30 for touching a nozzle 10a to a spool of a stationary mold 40 attached to the stationary platen 30. Arm portions of the connection member 50 are connected to the stationary platen 30 with bolts 52 at the same level as that of a center of the nozzle inserting hole 33 at opposite positions with the hole 33 between. A linear motion block 53 is attached to the connection member 50 and engaged with a linear motion rail 54 provided on a base of the injection molding machine. The linear motion rails 54 are arranged to extend in a direction parallel to a direction of a nozzle touch motion of the injection mechanism 10. Thus, the linear motion block 53 and the connection member 50 are movable in the direction parallel to the nozzle touch motion but unmovable in other directions.

A bearing unit 51 is provided integrally with the connection member 50 so as to support the ball-screw shaft 61 rotatably but unmovably in the axial direction. An enlarged view of the connecting portion of the stationary platen 30 and the connection member 50 is shown in FIG. 3. In FIG. 3, a spacer 56 is inserted into a hole formed in the arm portion of the connection member 50, and the connection member 50 is connected to the stationary platen 30 by a supporting bolt 52 inserted into the spacer 56. The spacer 56 is formed to have a length a little greater than a thickness of the arm portion of the connection member 50 by a minute amount δ. By connecting the arm portion of the connection member 50 to the stationary platen by the supporting bolt 52 using a washer 55, a minute gap corresponding to the amount 6 is formed between the stationary platen 30 and the arm portion of the connection member 50. A diameter of the through hole of the arm portion is set a little greater than a diameter of the spacer 56 to have looseness in a radial direction of the supporting bolt 52. The looseness is formed deliberately so as to prevent a vertical force from being applied to the stationary platen 30 by elastic deformation of the connection member 30 caused by the nozzle touch force.

Figure 4:
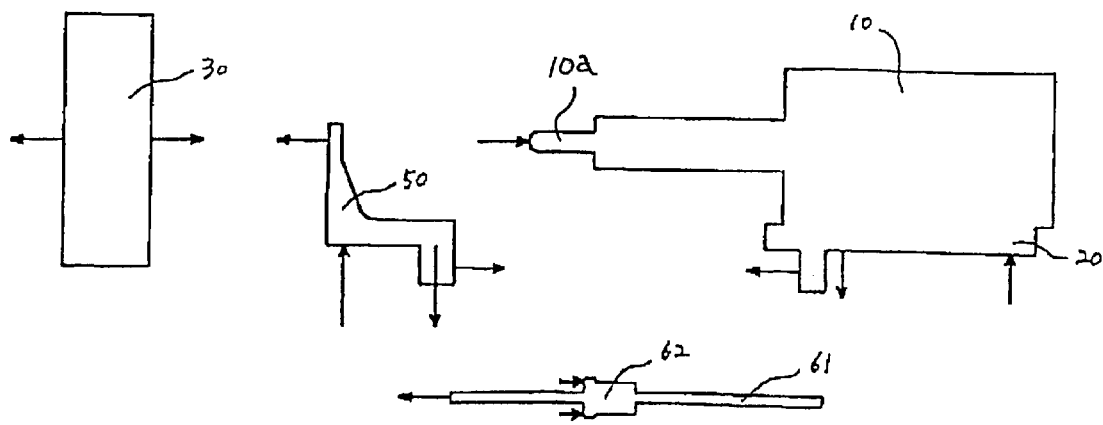
FIG. 4 is a diagrammatical view showing force balance on elements of the nozzle touch mechanism.

FIG. 4 shows balance of forces exerted on respective elements in the nozzle touch mechanism shown in FIG. 1. As can be seen from FIG. 4, the stationary platen 30 receives balanced forces in a straight line and no bending moment is produced on the stationary platen 30. A moment is caused on the connection member 50 by a difference between a center line of a driving force generated by the ball screw mechanism and a position of a nozzle touch force on the stationary mold and balanced by the force received from the linear motion rails. When the ball-screw nut 62 moves in the axial direction by a rotation of the ball-screw shaft 61 driven by the motor 65, the injection mechanism 10 is moved towards the stationary mold to move the nozzle 10a to touch and press the spool of the stationary mold. At this time, the nozzle touch force exerted on the stationary mold is transmitted to the stationary platen 30 and balanced by a pulling force of the connection member 50 transmitted from the ball-screw shaft 61. The driving force of the ball-screw shaft 61 is exerted on the coupling 64 but the coupling 64 is designed to have low rigidity in the axial direction not to generate any force in the axial direction, so that the nozzle touch force is substantially the same as the force of pulling the connection member 50 by the ball-screw shaft 61.

Thus, the nozzle touch force exerted on the stationary mold and transmitted to the stationary platen 30 is balanced by the pulling force of the connection member 50 through the connection bolts 52 arranged in the vicinity of a position of exertion of the nozzle touch force. Therefore, no bending moment is produced on the stationary platen 30 and all the bending moment is received by the connection member 50.

With the above arrangement, the stationary platen 30 and the stationary mold attached to the stationary platen 30 are not inclined by the nozzle touch force.

The connection member 50 moves by a little amount when the bending moment is exerted thereon by its own deformation. So as to allow the little motion of the connection member 50 in the axial direction of the ball-screw shaft 61 parallel to the direction of the nozzle touch force, the linear motion blocks 53 are slidably fitted on the linear motion rails 54 extending in the axial direction of the ball screw shaft 61, so that the connection member 50 mounted on the linear motion blocks 53 is movable only in the axial direction of the ball-screw shaft 61.

Figure 5:
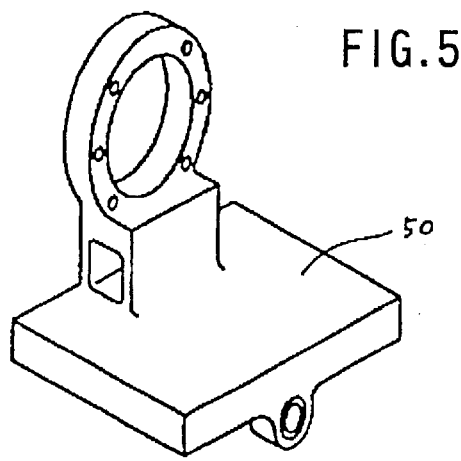
FIG. 5 is a perspective view of alternate example of the connection member.

In the foregoing embodiment, the connection member 50 has a pair of arm portions extending to the opposite positions of the through hole 33 to which the nozzle 10a is inserted and the arm portions and the stationary platen 30 is connected by the bolts 52. Alternately, the connection member 50 may have a annular member 50a to surround the through hole 33, as shown in FIG. 5, for connection of the connection member 50 with the stationary platen 30 using fixing members at more than three positions. The connecting manner other than those shown in FIGS. 2 and 5 can be adopted. The connection points of the connection member 30 with the stationary platen 30 are preferably arranged symmetrically with uniform space around the center of the central axis of the nozzle 10a.

Figure 6:
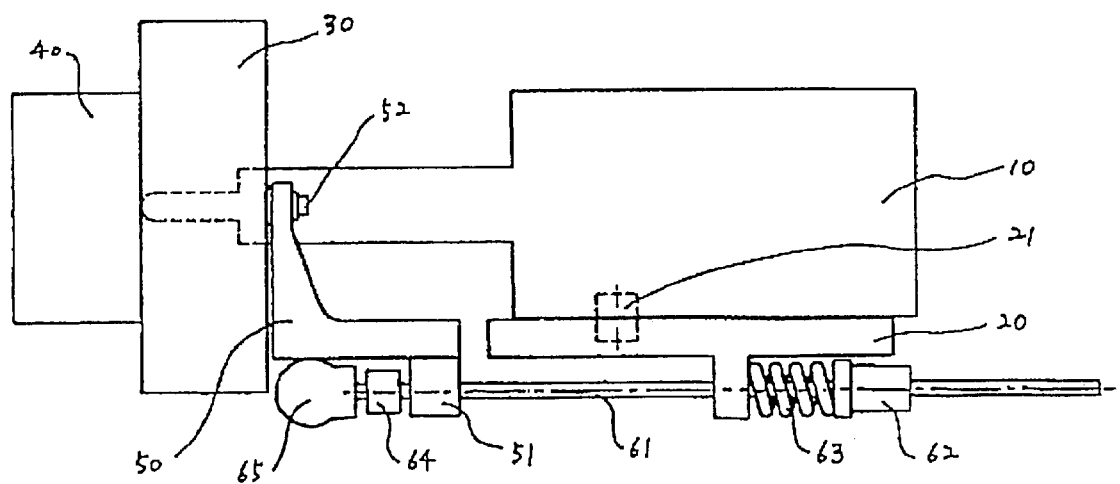
FIG. 6 is a schematic view of a nozzle touch mechanism according to a second embodiment of the present invention.

FIG. 6 shows a second embodiment of the present invention which differs from the first embodiment shown in FIG. 1 in that the motor 65 for driving the ball-screw shaft 61 is arranged at the connection member 50. Alternatively of the arrangement shown in FIG. 6, the motor 65 may arranged on the base of the injection molding machine, as shown in FIG. 1 and the ball-screw nut 62 and the spring 63 may be arranged on the connection member 50.

As described above, the amount of motion of the connection member 50 is small in the direction of the nozzle touch force, flat rollers or parallel leaf spring may be adopted for supporting the connection member 50.

Figure 7:
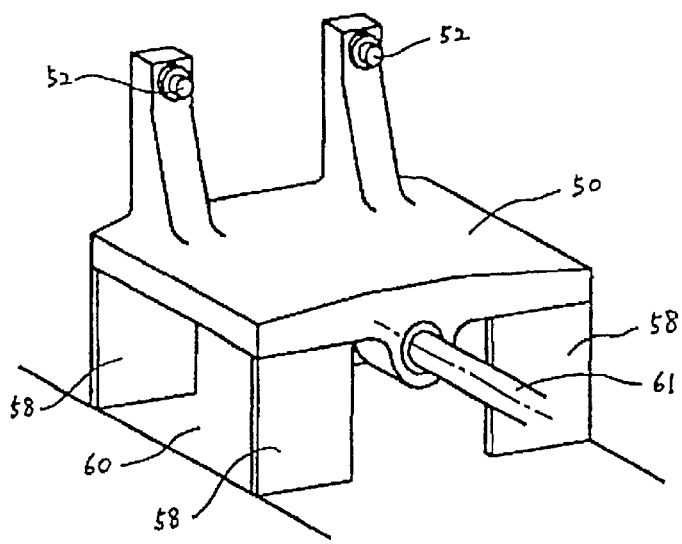
FIG. 7 is a perspective view showing a supporting manner of a connection member of the nozzle touch mechanism according to a third embodiment of the present invention.

FIG. 7 shows an arrangement according to the third embodiment in which the connection member is supported by a parallel leaf spring on the base of the injection molding machine. The leaf spring 58 is arranged so that a thickness direction thereof coincides with the direction of motion of the nozzle, to allow the connection member 50 to be displaced in the direction of the nozzle touch force, i.e., the direction of motion of the nozzle by a small amount. With this arrangement, the connection member 50 is allowed to move in the direction of the nozzle motion by a small amount but restricted not to move in the other directions.

Figure 8:
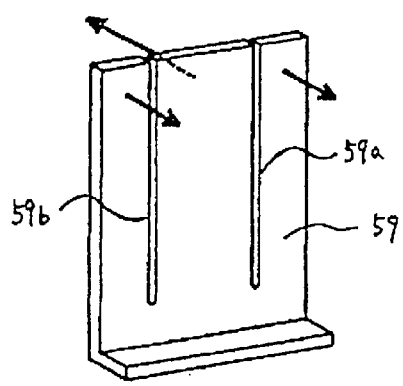
FIG. 8 is a perspective view of a leaf spring for supporting the connection member.
Figure 9:
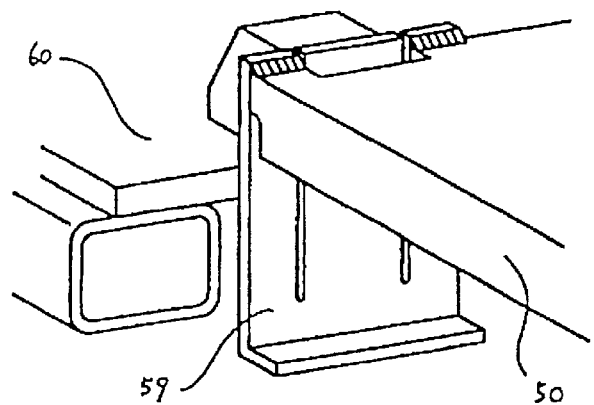
FIG. 9 is a perspective view showing a supporting manner of the connection member using the leaf spring as shown in FIG. 8.

In the case where it is difficult to arrange the leaf spring between the connection member 50 and the base 60, a leaf spring having slits as shown in FIG. 8 may be used to support the connection member 50 at substantially the same level as that of the base 60. The leaf spring 59 has slits 59a and 59b extending from one end to a midst thereof and a central one of the divided portions is connected to one of the connection member 50 and the base 60, and the remaining outside ones of the divided portions are connected to the other. In the example shown in FIG. 9, the central portion is fixed to the base of the injection molding machine and the outside portions are fixed to the connection member 50. Alternatively, only one slit may provided in the leaf spring 59, so that one of the divided portions is fixed to the connection member 50 and the other is fixed to the base 60.

In each of the forgoing embodiments, since the ball screw mechanism for moving the injection mechanism 10 relatively to the stationary platen 30 is arranged lower than the injection mechanism 10, the injection mechanism 10 can be easily swivelled around the swivel pin 21 by retracting the injection mechanism 10 to a position where the nozzle l0a does not interfere with the stationary platen 30, since no obstacle member hindering the swivel motion exists on the sides of the injection mechanism 10. The laborious work of detaching the ball-screw shaft 61 from the fixing member 32, as required in the nozzle tough mechanism shown in FIGS. 12a and 12b, is not necessary in the foregoing embodiments of the present invention.

Figure 10A:
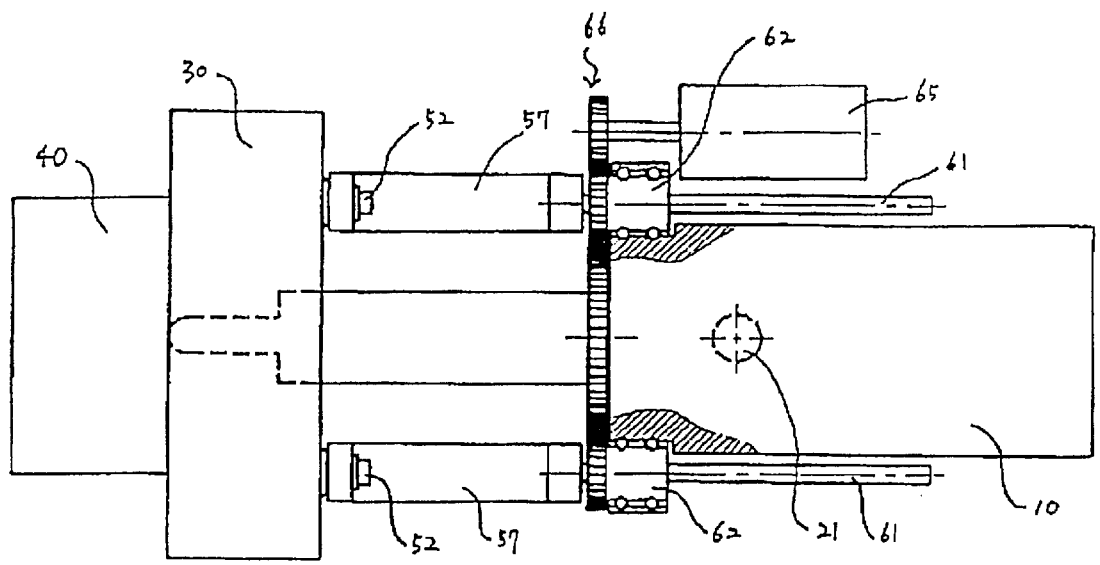
FIGS. 10a and 10b are a plan view and a side view, respectively, of a nozzle touch mechanism according to a fourth embodiment of the present invention.
Figure 10B:
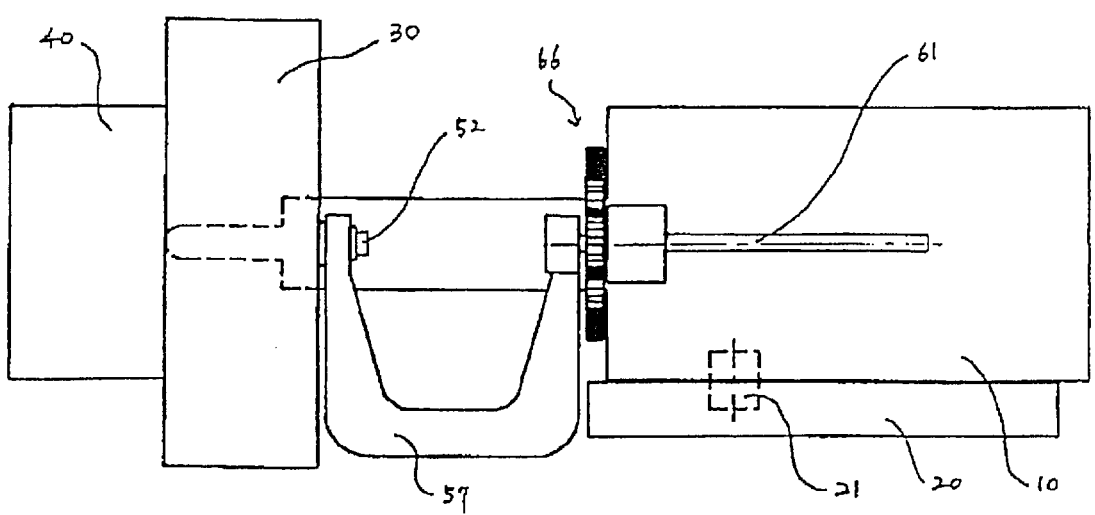

FIG. 10 shows a fourth embodiment of the present invention which is similar to the nozzle touch mechanism shown in FIGS. 12a and 12b but different in that the ball-screw shaft 61 is not extending to the stationary platen 30 but is connected to the stationary platen 30 through a U-shaped connection member 57, whereas the ball-screw shaft 61 is directly connected to the stationary platen 30 at one end thereof in the nozzle touch mechanism shown in FIGS. 12a and 12b.

In this forth embodiment, front ends of respective U-shaped connection members 57 are fixed to the stationary platen 30 at lateral positions of the through hole 30a by bolts 52 and the rear ends of the U-shaped connection members 57 are connected to front ends of the ball-screw shafts 61.

Ball-screw nuts 62 respectively engaged with the ball-screw shafts 61 are supported by the injection mechanism 10 rotatably but unmovably in the axial direction relatively to the injection mechanism 10. The ball-screw nuts 62 are driven by motors 65 provided at the injection mechanism 10 through a gear transmission 66.

The ball-screw nuts 65 rotate in synchronism with each other through the gear transmission driven by the motor 65. Since the ball-screw nuts 65 are engaged with the ball-screw shafts 61 respectively and the ball-screw shafts 61 are unrotatably fixed to the connection members 57, the ball-screw nuts 62 moves in the axial direction relatively to the ball-screw shafts 61 while rotating. The injection mechanism 10 supporting the ball-screw nuts 62 rotatably but unmovably relative thereto moves in the axial direction forward and backward close to and away from the stationary platen 30 with linear motion of the ball-screw nuts 62. The nozzle touch force exerted on the spool of the stationary mold 40 from the nozzle 10a is transmitted to the connection members 57. The reaction force of the nozzle touch force exerted on the nozzle 10a is transmitted to the connection members 57 through the injection mechanism 10, the ball-screw nuts 62 and the ball-screw shafts 61, and exerted on the stationary platen 30 as a pulling force acting at the connection portion of the connection members 57 on the same plane as the nozzle touch force is acting. Thus, the forces exerted on the stationary platen 30 are balanced on a substantially the same plane so that any moment is not produced on the stationary platen 30, resulting in that the stationary platen 30 and the stationary mold 40 are not inclined.

In this fourth embodiment, since the ball-screw shafts 61 are not extending beside the heating cylinder 10b and the U-shaped connection members 57 make side spaces of the heating cylinder open, maintenance and checking of the heating cylinder 10a can be performed with ease. In this embodiment, however, it is necessary to perform a detaching work including removal of the fixed connection of the U-shaped connection member 57 with the stationary platen 30 by means of the bolts.

According to the injection molding machine of the present invention, the stationary mold and the stationary platen are prevented form being inclined by the nozzle touch force, and a swivel motion, maintenance and checking of the injection mechanism can be performed with ease.

What is claimed is:

1. An injection molding machine comprising:
   a stationary platen to which a mold is attached;
   an injection mechanism for injecting molten material from a nozzle of a heating cylinder into the mold attached to said stationary platen; and
   a nozzle touch mechanism for moving said injection mechanism relatively to the mold attached to said stationary platen so that the nozzle touches and pushes a spool of the mold, said nozzle touch mechanism having a support member for supporting said injection mechanism to be movable, a driving unit arranged lower than the heating cylinder for moving the injection mechanism supported by the support member, and a connection member for connecting said stationary platen with said driving unit, said connection member and the stationary platen being connected at symmetrical positions with respect to a central axis of the nozzle, thereby a nozzle touch force exerted on the mold from said nozzle is transmitted to the stationary platen and balanced with a force exerted thereon from said connection member.

2. An injection molding machine according to claim 1, wherein said connection member is supported on a base of the injection molding machine.

3. An injection molding machine according to claim 2, wherein said connection member is supported so that a slight motion of said connection member moves only in the moving direction of the nozzle of the injection mechanism.

4. An injection molding machine according to claim 2, wherein said support member is guided by a linear guide having a guide rail or a guide shaft, and said connection member is supported so that a slight motion of said connection member moves linearly by said linear guide.

5. An injection molding machine according to claim 2, wherein said connection member is supported by a leaf spring on the base of the injection molding machine.

6. An injection molding machine according to claim 1, wherein said connection member is formed into a U-shape with one end connected to said stationary platen and the other end connected said driving unit.

7. An injection molding machine according to claim 1, wherein said driving unit comprises a ball-screw mechanism having a ball-screw shaft and a ball-screw nut engaged with the ball-screw shaft, and a motor for driving the ball screw mechanism.

8. An injection molding machine according to claim 7, wherein said ball-screw shaft is supported by said connection member rotatably but unmovably relatively to the connection member and is driven by said motor, and said ball-screw nut is supported by said support member unrotatably.

9. An injection molding machine according to claim 8, wherein said motor is mounted on the base of the injection molding machine.

10. An injection molding machine according to claim 8, wherein said motor is mounted on the connection member.

* * * * *